Jan. 7, 1958 R. HÖRTH 2,818,965
RUNWAY FOR CONVEYOR BELTS PASSING THROUGH CURVES
Filed July 26, 1954 3 Sheets-Sheet 1

Inventor:
Robert Hörth

Jan. 7, 1958 R. HÖRTH 2,818,965
RUNWAY FOR CONVEYOR BELTS PASSING THROUGH CURVES
Filed July 26, 1954 3 Sheets-Sheet 2
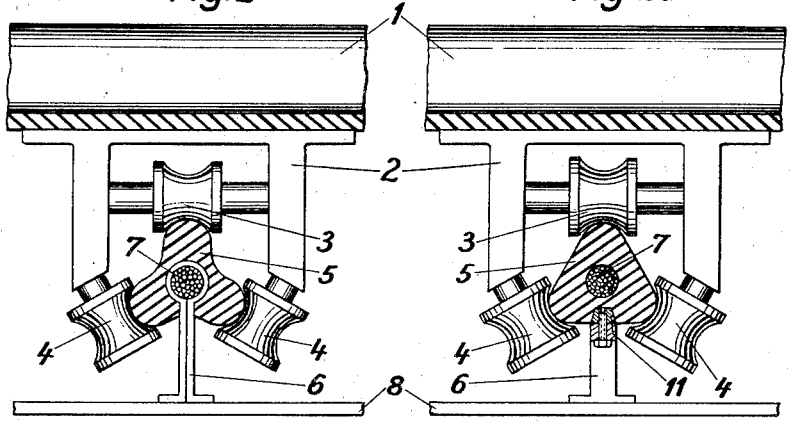
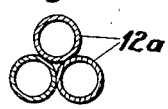
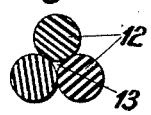
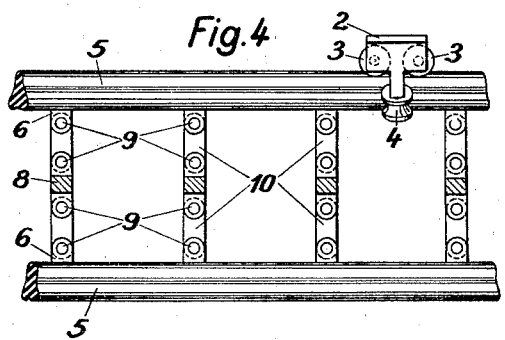
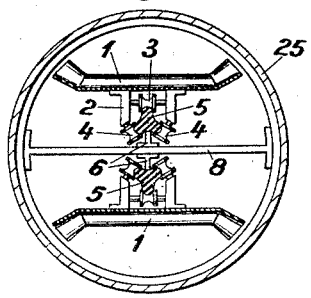
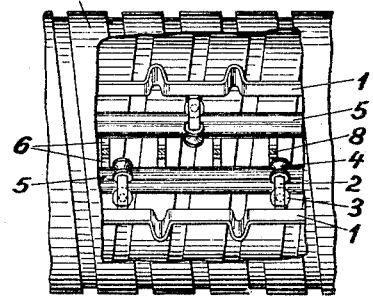
Inventor:
Robert Hörth Jan. 7, 1958 R. HÖRTH 2,818,965
RUNWAY FOR CONVEYOR BELTS PASSING THROUGH CURVES
Filed July 26, 1954 3 Sheets-Sheet 3
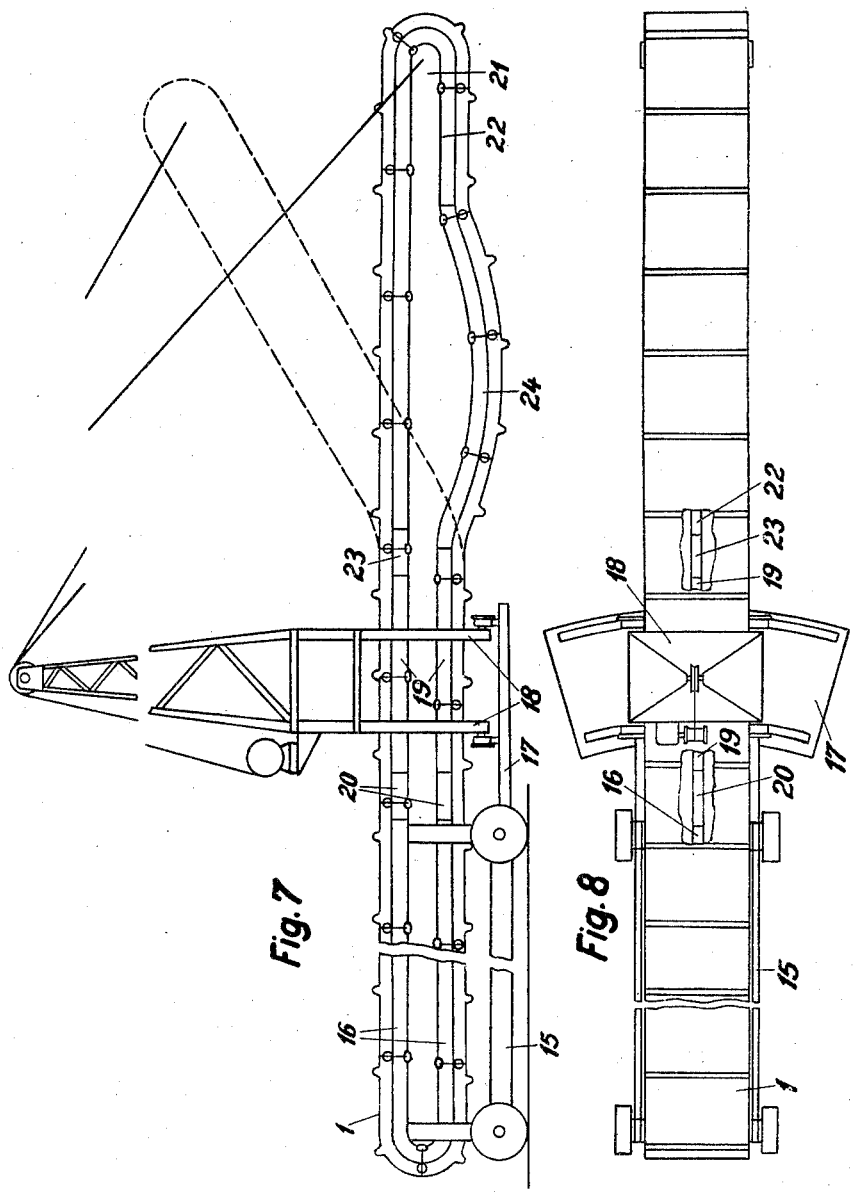
Inventor:
Robert Hörth United States Patent Office
2,818,965
Patented Jan. 7, 1958

2,818,965

RUNWAY FOR CONVEYOR BELTS PASSING THROUGH CURVES

Robert Hörth, Vlotho-Kalldorf, Germany, assignor to Friedrich K. H. Stübbe, Vlotho (Weser), Germany Application July 26, 1954, Serial No. 445,806

Claims priority, application Germany July 24, 1953

14 Claims. (Cl. 198—182)

The present invention relates to a one-rail track for a conveyor belt which is provided with running roller means and is adapted to pass through curves, while guiding roller means associated with the conveyor belt is provided for stabilizing the runner roller means.

The need of many plants for a simple and reliable conveyor belt adapted to pass through curves has brought about the development of belts which can travel in a vertical and in a horizontal plane and also simultaneously in both planes. The heretofore known belts travel on runways which are rigid per se and are fixedly mounted along the path on which the belt is supposed to travel. A change at any portion of the rigid runway is, therefore, possible only by removing the respective runway section and replacing the same by a new runway section which has the desired different shape. Of course, such exchange cannot be effected while the conveyor belt is in operation.

Furthermore, runway rails are known on the upper side of which running rollers travel while on the lower side of said runway rails guiding rollers travel. Such runways, however, have the drawback that only the running roller can exert a runway pressure, whereas the guiding roller serving to stabilize the carriage must by rim pressure prevent the belt from tilting or upsetting toward any side. If it is intended deliberately to tilt the belt toward the side, the two rollers exert only a rim pressure. The rollers will then, however, not any longer properly roll on the running surface.

In addition thereto, runway rails are known on the upper side of which running rollers will travel while guiding rollers will travel laterally so that no rim friction pressure but only rolling friction will occur on the guiding rollers. The pressure exerted by the guiding rollers upon the runway rail forms a right angle with the runway pressure of the running rollers. These runways, however, have the drawback that a reversing of the conveyor belt in vertical direction around a reversing drum will not be possible because the guiding rollers which now have to take the place of the running rollers are not in a position to carry the belt so that the latter would fall off the rail.

It is, therefore, an object of the present invention to provide a runway for conveyor belts which will overcome the above mentioned drawbacks.

It is another object of this invention to provide a conveyor belt adapted to pass through curves, in which not only the belt but also the track for the belt may during operation of the belt be placed or deviated along any desired curves in a horizontal and a vertical plane and can also be tilted.

It is still another object of this invention to provide a conveyor belt arrangement which will make it possible so to turn and guide the conveyor belt that not only the upper but also the lower belt section can be used for conveying purposes.

A still further object of this invention consists in the provision of a conveyor belt arrangement with completely encased runway.

These and other objects and advantages of the invention will appear more clearly from the following specification in connection with the accompanying drawings in which:

Figs. 2 and 2a represent a portion of a cross section through the conveyor belt arrangement of Fig. 1 with two further embodiments of the elastic track or running rail according to the invention.

Fig. 3 shows a cross section through the rigid track section according to Fig. 1.

Fig. 3a is a cross section through the elastic track section according to Fig. 1.

Fig. 4 is a side view of the runway or track according to Fig. 1 showing a running rail of the type illustrated in Fig. 2.

Fig. 5 is a cross section of the arrangement of a track according to the invention with a conveyor belt adapted to pass through curves housed in a flexible hose.

Fig. 6 is a side view of the arrangement according to Fig. 5, the flexible hose being partly sectioned.

Fig. 7 shows in diagrammatic illustration the employment of a track according to the invention in connection with a conveyor having a horizontally and vertically tiltable boom.

Figure 1:
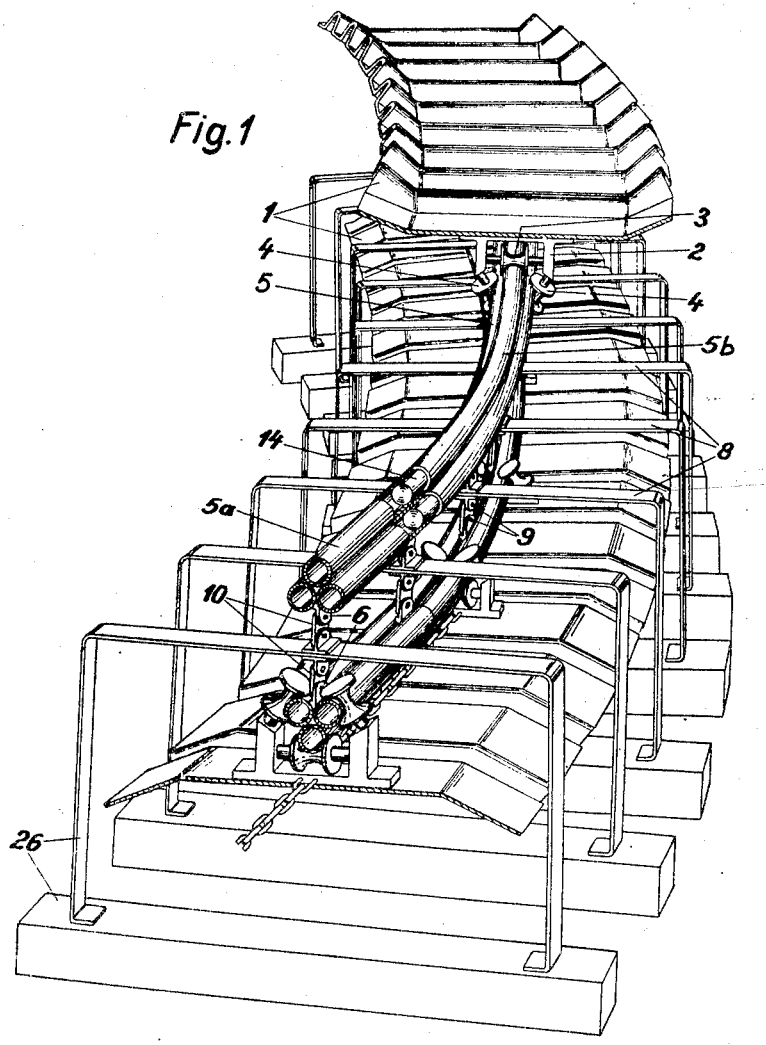
Figure 1 is a perspective view of a portion of a conveyor belt according to the invention, which comprises a belt as well as a track adapted to pass through a curve.

Fig. 8 diagrammatically shows a top view of the conveyor arrangement according to Fig. 7.

*General arrangement*

The problem underlying the present invention and outlined above has been solved by making the runway rail entirely or partly of elastic material, preferably of rubber, which material has a running surface of a hardness sufficient to withstand the roller pressure and also has sufficient flexibility to allow a deflection of the runway or track from a straight line, while the runway rail is provided with supports extending perpendicularly to the axes of the running rollers. The said runway rail is also provided laterally of said supports with running surfaces for guiding rollers. The arrangement is such that the axes of the guiding rollers form an acute angle with the axes of the running rollers.

This arrangement and design of the running rails not only allows deviations of the track from the driving direction in a horizontal and in a vertical plane but also makes possible distortions of the track about the longitudinal axis of the rail for instance for purposes of discharging the belt from the side. If those portions of the runway rails, which consist of elastic material are during the operation of the belt bent in such a manner that they form curves in a horizontal or a vertical plane or simultaneously in both planes, the running rollers transmit the load of the conveyor belt upon the runway rail, and the guiding rollers serve to stabilize the running rollers so that the conveyor belt will in its transverse direction always be located horizontally. When, by tilting or inclining the supporting members for the runway rails in a direction transverse to the belt, the conveyor belt is inclined laterally in order at a desired point to remove the goods from the conveyor belt, or if the conveyor belt is turned around at the deviating roller, a partial or complete relief of the running rollers is possible while correspondingly loading the guiding rollers.

Preferably, the runway rail has a substantially triangular cross section with rounded off corners, the rounded off corners serving as running surfaces for the rollers. The cross section of the runway rail may, for instance, be formed by three intersecting circles so that the rigid runway rail sections can be composed of tubes by welding the same together, while the elastic runway sections may be composed of rubber rods pasted or vulcanized to each other.

Furthermore it may be advantageous to provide those sections of the runway rail, which consist of elastic material, with a flexible and distortable core which is not substantially expansible in longitudinal direction.

A particularly advantageous embodiment of the invention is the arrangement of the runway within a flexible hose.

Structural arrangement

As shown in Fig. 1, the conveyor arrangement adapted to pass through curves comprises a conveyor belt adapted to pass through curves and a track. The conveyor belt 1 is provided with running means 2 having journalled therein running rollers 3 and guiding rollers 4 in such a manner that the axes of the guiding rollers form an acute angle with the axes of the running rollers while the pressure exerted by the guiding rollers upon the track comprises a component which is oppositely directed to the pressure exerted by the running rollers upon the track. The running and guiding rollers 3, 4 extend around a running rail 5 of the track, said running rail having a substantially triangular cross section with rounded off corners and comprising rigid and flexible running rail sections. Preferably, the rigid running rail sections 5a have the same cross section as the flexible running rail sections of elastic material. The cross section of the running rail is formed by three adjacent circles. The flexible and distortable running rail sections 5b consist of three rubber rods 12 vulcanized to each other as shown in cross section in Fig. 3a. The rigid running rail sections 5a consist of three tubes 12a welded to each other as shown in cross section in Fig. 3. The flexible running rail sections 5b and the rigid running rail sections 5a can be interconnected as shown at 14 in Fig. 1 by sliding the tapering ends of the rubber rods into the tubes. The running rail 5, 5a, 5b is provided with supports 6 arranged in spaced relationship with regard to each other which support the running rail in the desired position.

To further cross sectional shapes of the flexible running rail 5 are illustrated by way of example in Figs. 2 and 2a. The rigid running rail sections may be produced from corresponding profile iron. A wire core 7 which is flexible and distortable but longitudinally substantially not expansible is vulcanized into the running rail 5. Also into the hollow space 13 of the flexible running rail according to Figs. 1 and 3a, a core may be vulcanized. With the running rail according to Fig. 2, the supports 6 are vulcanized to the running rail and confine the core 7, whereas with the running rail according to Fig. 2a spaced nuts 11 are vulcanized into the lower side of the running rail. The supports 6 are rigidly connected with transverse stiffening members 8.

According to Figs. 1 and 4, the supports 6 are linked to the transverse stiffening members 8 by means of fishplates 10 and joints 9. This arrangement makes it possible to place the conveyor belt even upon highly undulated ground, such placement of the track being possible by the parallel displacement of the supports without requiring that in upwardly directed curves the lower running rail and in downwardly directed curves the upper running rail has to be expanded.

By means of the transverse stiffening members 8 which carry the track and thus the conveyor belt, the belt conveyor can be placed in any desired position in a manner known per se, for instance by journalling the transverse stiffening members 8 on supports 26 as shown in Fig. 1, or by suspending the transverse stiffening members as shown for instance in Fig. 5 and as will be described further below.

In order to avoid a canting of the carriage 2, each carriage may, if desired, in a manner known per se be provided with two running rollers 3 (Fig. 4) and the two guiding rollers 4 are preferably arranged vertically below the center of the connecting line between the running rollers as shown in Fig. 4.

By means of the transverse bars 8, the conveyor may be built into a flexible hose or a flexible tube 25 (Figs. 5 and 6). In this manner, a completely dust-free accident-proof closed conveyor is obtained which is safe against damage and can be laid along horizontal and vertical curves and can be bent and twisted during the operation. Inasmuch as the tube 25 is flexible along its entire length, also the running rail is preferably composed of flexible running rail sections.

Figs. 7 and 8 diagrammatically illustrate the employment of a track according to the invention in connection with a portable conveyor belt with horizontally and vertically tiltable boom. The reference numeral 15 designates a first carriage which is movable in longitudinal direction of the conveyor belt and has mounted thereon a rigid runway 16 for the conveyor belt 1. This carriage 15 is provided with a platform 17 carrying a second carriage 18 which is provided with a runway 19 and is adapted to travel in a direction transverse to the longitudinal direction of the conveyor belt. The runway rails of the runways 16 and 19 are interconnected by means of an elastic runway rail 20 so that the conveyor belt may form curves when the carriage 18 travels, and a boom 21 pivotally connected to the carriage 18 may be tilted toward the side. The boom 21 is provided with a rigid runway rail section 22 in the upper belt section and at the reversing point of the belt. The runway rail section 22 is connected with the upper runway rail of the rigid runway section 19 by means of an elastic runway rail section 23. In the returning lower belt section of the boom, a non-supported elastic runway rail section 24 is inserted between the lower rigid runway section 19 and the reversing point. The runway rail section 24 sags when the boom occupies a position other than its highest position. The elastic runway rail sections 23, 24 allow a vertical tilting of the boom inasmuch as the sagging runway rail section 24 will compensate during the lifting of the boom for the occurring extension of the runway.

It is, of course, understood that the present invention is, by no means, limited to the particular constructions shown in the drawings but also comprises any modifications within the scope of the appended claims.

What I claim is:

1. A single track runway arrangement for a conveyor belt which is adapted to pass through a curved path and is provided with axles respectively carrying a running roller and interconnected by a flexible pulling member, while guiding rollers are provided for stabilizing said running rollers, said runway arrangement comprising in combination: a runway rail arranged for engagement by said running rollers and composed of spaced rigid sections and interposed flexible connecting means, said flexible connecting means being made of elastic material and having a running surface hardness sufficient to withstand the pressure exerted thereupon by said running rollers and sufficiently flexible to allow a certain bending of the runway rail in one and the same plane from a straight line into a curved line; and supporting means connected to said runway rail and extending in the direction of the pressure exerted by said running rollers upon the runway rail, said runway rail also being provided with runway surfaces arranged for engagement by said guiding rollers, said runway surfaces being located laterally of said supporting means, and said guiding rollers being so arranged that the pressure exerted by said guiding rollers upon said runway rail comprises a component opposed to the pressure exerted upon said runway rail by said running rollers, the axes of rotation of said guiding rollers and running rollers forming acute angles with each other.

2. A runway arrangement for conveyor belts adapted to pass through curves and comprising running rollers and guiding rollers and axles carrying said rollers and being interconnected by a flexible pulling member, said running and guiding rollers being arranged in sets each of which has a running roller and two guiding rollers with the axes of the rollers of each set triangularly arranged with regard to each other which includes a single runway rail having a running surface for contact with said running rollers and two guiding surfaces for contact with said guiding rollers, said single runway rail being composed of spaced rigid sections, interposed flexible sections of elastic material, and flexible deformable but longitudinally substantially inexpandable core means embedded within said flexible sections, said flexible sections of said runway rail having a running surface hardness sufficient to withstand the pressure exerted thereupon by said running rollers and being sufficiently flexible to allow a certain bending of the runway rail from a straight line into a curved line.

3. A single rail runway arrangement for a conveyor belt adapted to pass through curves and comprising running and guiding rollers and axles therefor interconnected by a flexible pulling member and supporting said rollers, which includes an endless runway rail engaged by said running and guiding rollers and comprising spaced rigid runway rail sections interconnected by flexible runway rail sections of elastic material having a running surface hardness sufficient to withstand the pressure exerted thereupon by said running rollers and being sufficiently flexible to allow a certain bending of the runway rail from a straight line in one and the same plane into a curved line, and a plurality of supporting members pivotally connected with said runway rail for supporting the same, said supporting members being substantially parallel to each other.

4. A one-rail track arrangement for a belt conveyor adapted to pass through curves, which comprises in combination: a belt adapted to pass through curves, running roller means, supports for said running roller means, said supports being connected to said belt, guiding roller means arranged for cooperation with said running roller means, a runway rail composed at least partially of elastic material sufficiently flexible to allow a certain bending of the runway rail in one and the same plane from a straight path into a curved path, said runway rail being engaged by said running roller means and said guiding roller means, the axes of rotation of said running roller means and said guiding roller means being triangularly arranged with regard to each other, and supporting means supporting said runway rail, the elastic material of said runway rail being sufficiently hard to withstand the pressure exerted by said running roller means upon said runway rail.

5. An arrangement according to claim 4, in which the guiding roller means are arranged substantially symmetrically with regard to and on each side of said supporting means.

6. An arrangement according to claim 4, in which the elastic material consists of a rubber composition.

7. An arrangement according to claim 4, in which the elastic material is expandable in longitudinal direction of the runway rail.

8. An arrangement according to claim 4, in which the runway rail has a substantially triangular cross section with rounded-off corners.

9. An arrangement according to claim 4, in which the runway rail is composed of three tubular members arranged adjacent to each other and interconnected so that the cross section of said runway rail is defined by three circles arranged in point contact with each other.

10. An arrangement according to claim 4, which includes a flexible hose enclosing said belt and said runway rail and supporting said supporting means for said runway rail.

11. A runway arrangement for a conveyor belt adapted to pass through curves and comprising running and guiding rollers and axles therefor carrying said rollers and interconnected by a flexible pulling member, the axes of rotation of said running and guiding rollers being triangularly arranged with regard to each other, which includes in combination: a first rigid runway rail section, a first carriage supporting said first rigid runway rail section and provided with a platform, a second rigid runway rail section spaced from said first rigid runway rail section, a second carriage supporting said second rigid runway rail section and movable on said platform in a direction substantially transverse to the longitudinal direction of said first carriage, and a flexible runway rail section interconnecting said first and said second rigid runway rail sections so as to allow said first and said second rigid runway rail sections to be turned relative to each other, all of said runway rail sections forming an endless single rail engaged by said running and guiding rollers, said flexible runway rail section being longitudinally substantially inexpandable and being of elastic material and having a running surface hardness sufficient to withstand the pressure exerted thereupon by said running rollers and being sufficiently flexible to allow a certain bending of the runway rail from a straight line into a curved line.

12. A runway rail system with an endless single runway rail forming an upper track and a lower track for use in connection with an endless conveyor belt adapted to pass through curves and comprising running and guiding rollers arranged triangularly with regard to each other for engagement with said single runway rail and also comprising axles carrying said rollers and interconnected by a flexible pulling member, said runway rail system including: a U-shaped first rigid runway rail section forming one reversing station of said endless runway rail, a first carriage supporting said first rigid runway rail section and provided with a platform, a pair of first flexible runway rail sections respectively having one end thereof connected to the upper and lower track portions of said first rigid runway rail section, a pair of second rigid runway rail sections respectively having one end thereof connected to the other end of said first flexible runway rail sections, a second carriage supporting said second rigid runway rail sections and movable on said platform in a direction substantially transverse to the longitudinal direction of said first carriage, a second flexible runway rail section connected to the other end of the upper one of said second rigid runway rail sections, a third rigid runway rail section having one end connected to and extending from the other end of said second flexible runway rail section in cantilever fashion and forming the other reversing station for said endless runway rail, a further flexible runway rail section interconnecting said third rigid runway rail section and the lower one of said second rigid runway rail sections and hanging through in a slack manner when said third rigid runway rail section is substantially horizontal, and means operatively connected with said third rigid runway rail section for selectively lifting and lowering the same in the manner of a boom, said flexible runway rail sections being of elastic material with a flexible deformable but longitudinally substantially inexpandable core embedded therein and having a running surface hardness sufficient to withstand the pressure exerted thereupon by said running rollers while being sufficiently flexible to allow a certain bending of the runway rail from a straight line into a curved line.

13. A one-rail track arrangement for a belt conveyor adapted to pass through curves, which comprises in combination: a belt adapted to pass through curves, running roller means, supports for said running roller means, said supports being connected to said belt, guiding roller means arranged for cooperation with said running roller means and carried by said belt, a single runway rail having a running surface extending in longitudinal direction of said rail for contact with said running roller means and having two spaced guiding surfaces extending in longitudinal direction of said rail for contact with said guiding roller means, the axes of rotation of said running roller means and said guiding roller means being triangularly arranged with regard to each other and said running surface and said guiding surfaces being arranged in planes triangularly arranged with regard to each other, said single runway rail being composed at least partially of elastic material sufficiently flexible to allow a certain bending of the runway rail in one and the same plane from a straight path into a curved path, and supporting means supporting said runway rail substantially along the longitudinal vertical plane through said runway rail, the elastic material of said runway rail being sufficiently hard to withstand the pressure exerted by said running roller means upon said runway rail.

14. A single track runway arrangement for a conveyor belt which is adapted to pass through a curved path and is provided with axles respectively carrying a running roller interconnected by a flexible pulling member, said belt also carrying guiding rollers for stabilizing said running rollers, the guiding and running rollers being arranged in sets each comprising a running roller and two guiding rollers, said runway arrangement comprising in combination: a runway rail arranged for engagement by said running rollers and composed of spaced rigid sections and interposed flexible connecting means, said flexible connecting means being made of elastic material and having a running surface hardness sufficient to withstand the pressure exerted thereupon by said running rollers and sufficiently flexible to allow a certain bending of the runway rail in one and the same plane from a straight line into a curved line; and supporting means connected to said runway rail and extending in the direction of the pressure exerted by said running rollers upon the runway rail, said runway rail also being provided with runway surfaces arranged for engagement by said guiding rollers, said runway surfaces being located laterally of said supporting means, and said guiding rollers being so arranged that the pressure exerted by said guiding rollers upon said runway rail comprises a component opposed to the pressure exerted upon said runway rail by said running rollers, the axes of rotation of said guiding and running rollers of each set being triangularly arranged with regard to each other.

References Cited in the file of this patent

UNITED STATES PATENTS

| | | |
|---|---|---|
| Re. 22,789 | Brunner | Sept. 10, 1946 |
| 2,028,401 | Lore | Jan. 21, 1936 |